No. 777,282. PATENTED DEC. 13, 1904.
D. L. FORD.
AUTOMATIC RIBBON REVERSE FOR TYPE WRITERS.
APPLICATION FILED MAY 12, 1904.
NO MODEL.

Witnesses

Inventor
David L. Ford
by Knight Bros.
Attorneys

No. 777,282.    Patented December 13, 1904.

UNITED STATES PATENT OFFICE.

DAVID L. FORD, OF WASHINGTON, DISTRICT OF COLUMBIA, ASSIGNOR TO UNDERWOOD TYPEWRITER COMPANY, OF NEW YORK, N. Y., A CORPORATION OF NEW JERSEY.

AUTOMATIC RIBBON-REVERSE FOR TYPE-WRITERS.

SPECIFICATION forming part of Letters Patent No. 777,282, dated December 13, 1904.

Application filed May 12, 1904. Serial No. 207,665. (No model.)

*To all whom it may concern:*

Be it known that I, DAVID L. FORD, a citizen of the United States, and a resident of Washington, District of Columbia, have invented certain new and useful Improvements in Automatic Ribbon-Reverses for Type-Writers, of which the following is a specification.

This invention relates to ribbon-reversing mechanism for type-writing machines; and it has for its object to provide an improved construction in which when one spool becomes empty it will be thrown out of gear with the spool-operating mechanism and the other ribbon will be instantaneously thrown in gear.

Other objects and advantages will appear in the following description and will be particularly pointed out in the appended claims.

This ribbon mechanism is particularly adapted for that type of machine known as the "Underwood," although with changes certain features thereof may be employed on other types of machines.

Figure 1:
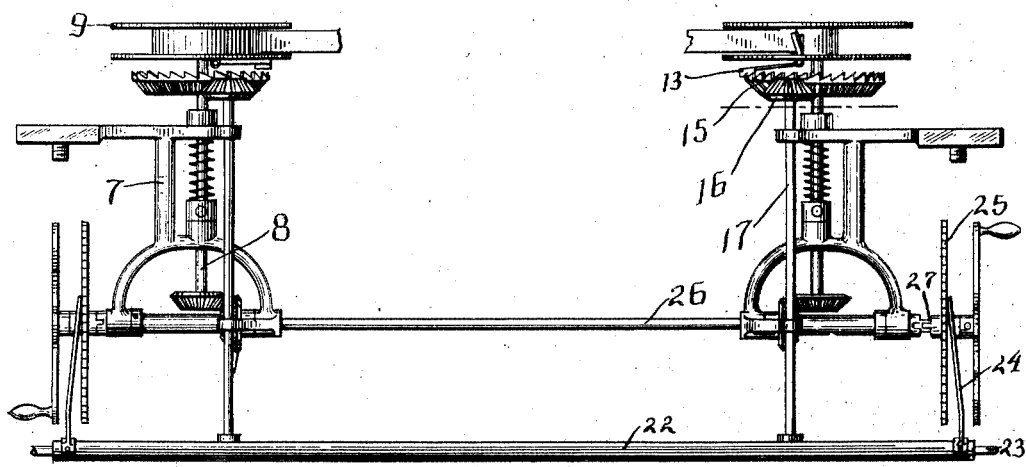
Figure 2:
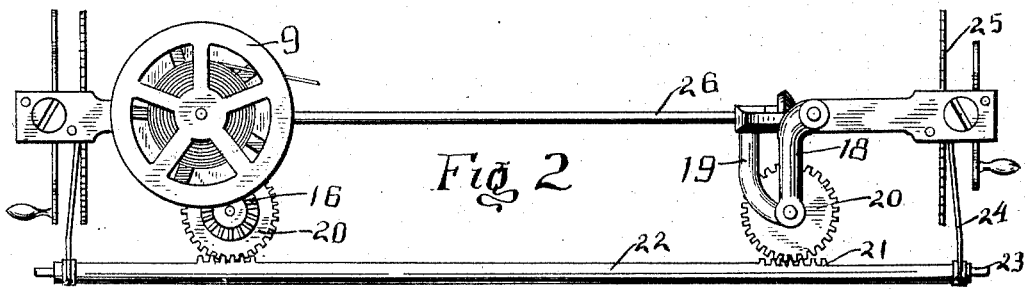
Figure 3:
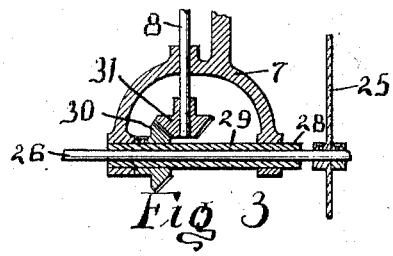
Figure 4:
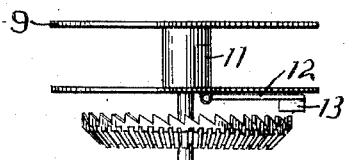
Figure 5:
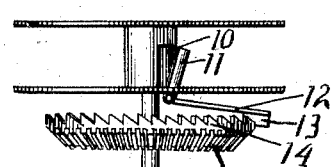
Figure 6:
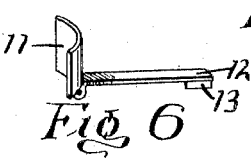

In the drawings, Figure 1 is a front elevation of the ribbon mechanism as it appears when mounted on an Underwood machine. Fig. 2 is a top plan view of my invention. Fig. 3 is a detail view showing the mounting of one end of the axially-movable shaft; and Figs. 4, 5, and 6 show the shifting-dog, respectively, in inoperative, operative, and detached condition.

Referring more particularly to the drawings, 7 indicates the usual spool-shaft-supporting brackets, the usual spool-shafts 8 being journaled therein and carrying at their upper ends spools 9. The hubs of each of these spools are recessed at 10 for the reception of a curved arm 11, extending upwardly from a shifting-dog 12. This dog 12 is pivoted to the under side of a spool, extends radially beneath the same, and is provided at its outer end with a tooth 13. When a ribbon is around the spool, the tooth 13 of the dog is held in a raised position; but as soon as the spool becomes empty the tooth 13 drops into engagement with a rotary device loosely journaled on the shaft 8 beneath the spool. This rotary device is provided on its upper surface and around its periphery with teeth 14, between which the tooth 13 is held, and on its under surface a bevel-gear 15 is provided. As the spool-shaft is being revolved by a means hereinafter to be mentioned, when the dog drops the bevel-gear revolves also, and as it meshes with a bevel-gear 16 on a vertical shaft 17, supported by arms 18 and 19 from the bracket 7, the shaft 17 is also rotated. The shaft 17 has keyed to its lower end a pinion 20, which meshes with one of the racks 21 on a tubular sliding rod 22, supported on a rod 23, located below the type-arm and above the key-levers. The tubular slide-rod 22 is provided with two racks 21, one for each pinion 20 of the two ribbon-spools, and at each end of said rod is further provided a spring-arm or other yielding device 24, which bears against the side of the toothed wheel 25, motion being imparted through the medium of a pair of pawls to both wheels 25 on striking a key. These toothed wheels 25 are rigidly secured on an axially-movable shaft 26, which extends from one spool-supporting bracket 7 to the other beneath the type-arms and above the key-levers, so that the shaft 26 is actuated by both wheels 25. Each toothed wheel is provided with a clutch-face 27 for engagement with the end 28 of a hollow shaft 29, journaled in one of the brackets 7 and carrying a bevel-gear 30, which engages with a like gear 31 on the spool-carrying shaft 8.

The operation of the invention is as follows: When a spool 9 becomes empty, the arm 11 is released and the tooth 13 of the dog drops between the teeth 14 on the rotary device, and a continued movement of the spool by the ribbon being withdrawn therefrom will cause gear 15 to be rotated, thereby rotating gear 16, shaft 17, and pinion 20, which in turn shifts rod 22. The rod 22 being moved shifts, through spring-arm 24 adjacent the empty spool, the shaft 26, and as both wheels 25 are carried by said shaft the toothed wheel adjacent the full spool will be thrown out of operative relation with its spool while the toothed wheel near the empty spool will be thrown into operative relation with its spool. The operation will then take place in a reverse direction. The shape of the teeth 14 permits the dog 12 to ride over them after the spool has been connected to the operating mechanism. The spring-arms 24 provide a yielding connection between the rod 22 and the shaft 26, so that if the clutch-face 27 is not in position to engage the end of the hollow shaft 28 the rod 22 may be moved, and the shaft 26 will quickly follow it as soon as the clutch-face 27 is in proper position.

I desire it to be understood that I may make various changes within the scope of the appended claims in the form, the proportion, and the details of construction without departing from the spirit or sacrificing any of the advantages of my invention.

I claim—

1. The combination with a pair of spools, rotating on vertical axes, of an axially-movable shaft for alternate connection with said spools to rotate the same, rotatable devices located beneath said spools, dogs released when the spools become empty and forming connection between a spool and the rotary device beneath, to cause them to turn together, and connections between the rotary devices and the axially-moving shaft for moving the shaft axially when either of said rotary devices is operated.

2. The combination with a pair of rotary spools, and mechanism for operating the same, of a pair of rotary devices each having its axis in alinement with the axis of one of the spools, means controlled by the ribbon for connecting a spool with its adjacent rotary device, to cause the device to turn with said spool, and means connecting the rotary devices with the spools-operating mechanism to cause the operating mechanism to be shifted from one spool to the other.

3. The combination with a pair of rotary spools and mechanism for operating the same, of a pair of rotary devices each having its axis in alinement with the axis of one of the spools, a dog operated by the ribbon for connecting a spool with the adjacent rotary device to cause the rotary device to turn with the spool, and means connecting the rotary devices with the spools-operating mechanism to cause the said operating mechanism to be shifted from one spool to the other.

4. The combination with a pair of rotary spools and mechanism for operating the same, of a pair of rotary devices each having its axis in alinement with the axis of one of the spools, a dog pivoted to a spool and released by the ribbon to cause it to drop into engagement with the adjacent rotary device, and the rotary device to turn with the spool, and means connecting the rotary devices with the spools-operating mechanism to cause the said operating mechanism to be shifted from one spool to the other.

5. The combination with a pair of rotary spools and mechanism for operating the same; of a pair of rotary devices each having its axis in alinement with the axis of one of the spools and provided with engaging teeth around its periphery, a dog pivoted to a spool and controlled by the ribbon to cause it to be thrown into engagement with the teeth, and means connecting the rotary devices with the spools-operating mechanism to cause the said operating mechanism to be shifted from one spool to the other.

6. The combination with a pair of rotary spools, and mechanism for alternately operating the same, of rotary toothed devices, one being positioned adjacent each spool, dogs held out of engagement with the toothed devices by the ribbons, one being moved into engagement with a toothed device when a spool becomes empty to cause the toothed devices to turn with the spool, and means connecting the rotary toothed devices with the spools-operating mechanism to cause the operating mechanism to be shifted from one spool to the other.

7. The combination with a pair of rotary spools, and spool-operating mechanism embodying an axially-movable shaft, of a shifting-rod for moving the shaft, racks on the shifting-rod, gears meshing with the racks on the shifting-rod, and mechanism controlled by the ribbon for alternately rotating the gears in reverse directions.

8. The combination with a pair of rotary spools, of an axially-movable shaft carrying clutch-faces for connection with the spools to cause them to turn with the shaft, a shifting-rod, spring-arms carried by the rod and connected with the axially-movable shaft, a pair of rotary devices each having its axis in alinement with the axis of one of the spools, connections between the rotary devices and the shifting-rod, and means operated by the ribbon to cause the rotary device to turn with the spool.

9. The combination with a pair of spool-shafts, spools turning therewith and mechanism for operating the spool-shafts, of a pair of rotary devices each revoluble on one of the spool-shafts, means controlled by the ribbon for connecting a spool with its adjacent rotary device to cause said device to turn with the spool, and means connecting the rotary devices with the spools-operating mechanism to cause the operating mechanism to be shifted from one spool to the other.

10. The combination with a pair of vertical spool-shafts and spools carried thereby, mechanism for operating said spool-shafts, a pair of rotatable devices each journaled on one of the shafts, means operated by the ribbon for connecting a spool with its adjacent rotatable device to cause said device to turn with the spool, and means for connecting the rotatable devices with the spools-operating mechanism to cause said mechanism to be shifted from one spool to the other.

The foregoing specification signed this 6th day of April, 1904.

DAVID L. FORD.

In presence of—
   HARVEY S. KNIGHT,
   EDWIN S. CLARKSON.